Patented Aug. 20, 1929.

1,725,734

UNITED STATES PATENT OFFICE.

BENJAMIN HEAP, OF CLIFTON JUNCTION, MANCHESTER, ENGLAND, ASSIGNOR TO THE ELECTRIC STORAGE BATTERY COMPANY, OF PHILADELPHIA, PENNSYLVANIA, A CORPORATION OF NEW JERSEY.

DRY-STORAGE-BATTERY PLATE AND METHOD OF MAKING THE SAME.

No Drawing.   Application filed January 5, 1925.   Serial No. 681.

The principal objects of the present invention are to provide dry charged negative pole plates for lead-sulphuric acid secondary batteries adapted to retain capacity during comparatively long periods of storage and fitted for use in a battery without material loss of efficiency and life, and to provide a simple expeditious, reliable and comparatively inexpensive method of treating wet charged negative pole plates to dry and impart to the same the qualities above set forth.

The invention will be claimed at the end hereof but will be first described.

Negative pole plates are usually produced by the application to a suitable grid of paste containing lead compounds, and the plates so produced are mounted in cells or tanks and current is passed through the plates to reduce the compounds to spongy lead. The negative pole plates are charged and the spongy lead is subject to rapid oxidation and consequent loss of capacity upon exposure to the air. According to the present invention the charged negative plates while wet are taken from the tanks or cells in which they are electrolytically reduced and are immersed in a solution of gelatin containing formaldehyde. The plates are immediately transferred to a drying oven which provides heat and non-oxidizing atmosphere. Care should be taken that all drying is as nearly as possible eliminated from the time the plates leave the tanks until they get into the drying oven. This can be accomplished by the exercise of speed. The effect of immersing the plates in the solution is to superficially apply the latter to them or, in other words, to coat them with the solution, and when the plates are dry and after removal from the oven they retain a coating or superficial impregnation. The oven is a means for subjecting the plates to heat in a reducing or non-oxidizing atmosphere which is usually steam. The material applied to the plates is an oxidation inhibitor and as such it operates to prevent loss of capacity during storage of the plates for even comparatively long intervals. The oxidation inhibitor is soluble in electrolyte so that when the plates are used in a secondary battery it is without detrimental effect. Gelatin is an example of an oxidation inhibitor soluble in electrolyte although the invention, being of a chemical or electro-chemical nature, the benefit of the doctrine of equivalents applicable in such cases is reserved. Formaldehyde may well be used along with gelatin which it tends to preserve and to make more waterproof. It may be said that the oxidation inhibitor operates in respect primarily to atmospheric moisture. Good results have been obtained by using a solution consisting of 5% by weight of gelatin in water to which is added 5% by volume of a 40% solution of formaldehyde. However, the proportions are not critical and good results have been obtained by the use of 1½% by weight of gelatin and the formaldehyde may be omitted or even replaced by an equivalent under the doctrine of equivalents above referred to.

The product is a dry charged negative pole plate for secondary batteries containing spongy lead and provided with an oxidation inhibitor soluble in electrolyte so that it can be stored for a considerable length of time and will not lose its capacity through atmospheric conditions or other conditions which it is likely to encounter, and when used in a battery the inhibitor is soluble in the electrolyte and the plate possesses efficiency and long life.

It will be obvious to those skilled in the art to which the invention relates that modifications may be made in details of procedure, in the substitution of equivalents and in mere matters of form without departing from the spirit of the invention which is not limited to such matters or otherwise than as the prior art and the appended claims may require.

I claim:

1. The process of treating charged negative pole plates of lead secondary batteries to dry and fit the same for storage without material loss of capacity comprising dipping the wet charged plates into a solution of gelatin containing formaldehyde, and, without previous drying, subjecting the charged plates so treated to heat in a non-oxidizing atmosphere to dry and provide the same with an oxidation inhibitor soluble in electrolyte.

2. The process of treating charged negative pole plates of lead secondary batteries to dry and fit the same for storage without material loss of capacity comprising dipping the wet charged plates into a solution of gelatin, and, without previous drying, subjecting the charged plates so coated to heat in a non-oxidizing atmosphere to dry and provide the same with an oxidation inhibitor soluble in electrolyte.

3. A dry charged negative pole plate for secondary batteries containing spongy lead and having a coating of gelatin.

4. A dry charged negative pole plate for secondary batteries containing spongy lead and having a coating of gelatin and formaldehyde.

BENJAMIN HEAP.